United States Patent
Keiter et al.

(10) Patent No.: US 7,633,173 B2
(45) Date of Patent: Dec. 15, 2009

(54) ELECTRONIC CONTROLLER MATCHING ENGINE POWER TO ALTERNATOR POWER AND MAINTAINING ENGINE FREQUENCY FOR A FREE-PISTON STIRLING ENGINE DRIVING A LINEAR ALTERNATOR

(75) Inventors: Douglas E. Keiter, Athens, OH (US); Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 0 days.

(21) Appl. No.: 12/194,588

(22) Filed: Aug. 20, 2008

(65) Prior Publication Data
US 2008/0309095 A1 Dec. 18, 2008

Related U.S. Application Data

(62) Division of application No. 11/605,601, filed on Nov. 29, 2006, now Pat. No. 7,453,241.

(51) Int. Cl.
*F02D 9/04* (2006.01)
(52) U.S. Cl. .................. 290/40 R; 290/40 C; 290/40 A
(58) Field of Classification Search ................ 290/40 R
See application file for complete search history.

(56) References Cited

U.S. PATENT DOCUMENTS

| | | | |
|---|---|---|---|
| 3,982,168 A | 9/1976 | Bose et al. | |
| 4,601,171 A | 7/1986 | Stotts | |
| 4,873,826 A | 10/1989 | Dhar | |
| 5,630,155 A | 5/1997 | Karaki et al. | |
| 6,693,409 B2 | 2/2004 | Lynch et al. | |
| 6,856,107 B2 | 2/2005 | Daboussi | |
| 6,871,495 B2 | 3/2005 | Lynch et al. | |
| 7,081,738 B2 | 7/2006 | Muramatsu et al. | |
| 7,560,908 B2 * | 7/2009 | Herbstritt et al. | 322/37 |
| 7,589,430 B2 * | 9/2009 | Nakamura et al. | 290/40 R |

* cited by examiner

*Primary Examiner*—Nicholas Ponomarenko
*Assistant Examiner*—Iraj A Mohandesi
(74) *Attorney, Agent, or Firm*—Frank H. Foster; Kremblas, Foster, Phillips & Pollick

(57) ABSTRACT

A feedback control method and circuit for inclusion in a control system of an electrical power generating source that comprises a free piston Stirling engine driving a linear alternator. An instantaneous value of a variable, $V_{internal}$, is continuously derived from other sensed and computed parameters and used in a negative feedback control loop of the control system to control engine piston stroke in order to maintain the power produced by the engine equal to the power transferred from the engine to the alternator. $V_{internal}$ is the sum of the voltage induced on the alternator winding and the voltage across the equivalent circuit lumped resistance of the alternator winding.

A switching mode rectifier connects the alternator winding to an energy storage capacitor or battery. A negative feedback, alternator current control loop has an output connected to the pulse width modulator of the switching mode rectifier and has a feedback circuit comprising a current sensor for sensing instantaneous alternator current. A negative feedback, $V_{internal}$ control loop has a feedback circuit including a piston position or velocity sensor connected to a computing circuit that the current sensor is also connected to. The computing circuit computes a signal representing $V_{internal}$ for use as the feedback signal of the $V_{internal}$ control loop. The output of the $V_{internal}$ control loop is connected as the command input to the current feedback control loop.

5 Claims, 4 Drawing Sheets

Fig. 1 PRIOR ART
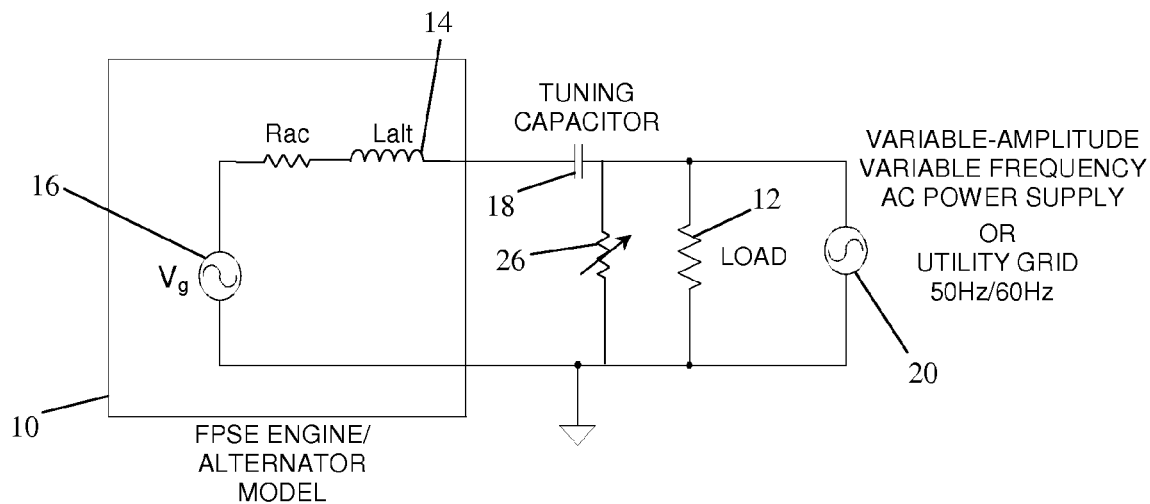
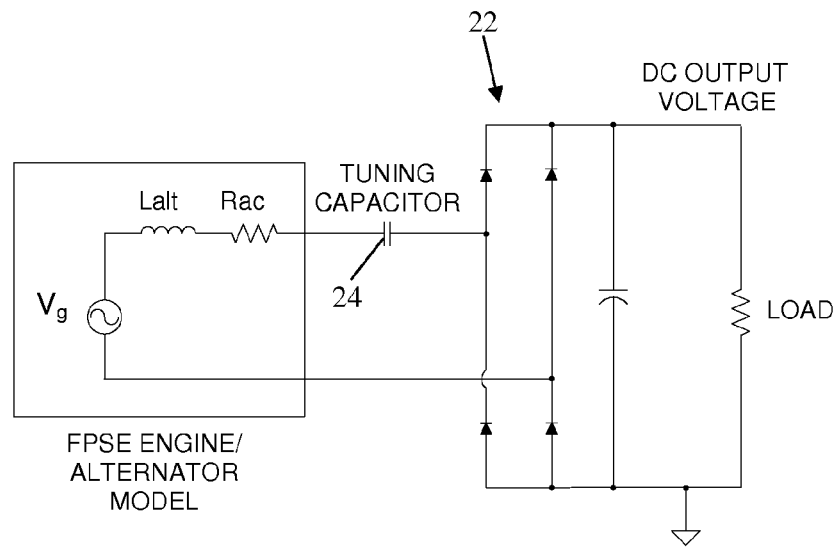
Fig. 2 PRIOR ART

ELECTRONIC CONTROLLER MATCHING ENGINE POWER TO ALTERNATOR POWER AND MAINTAINING ENGINE FREQUENCY FOR A FREE-PISTON STIRLING ENGINE DRIVING A LINEAR ALTERNATOR

CROSS-REFERENCES TO RELATED APPLICATIONS

This application is a division of application Ser. No. 11/605,601 filed Nov. 29, 2006.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to a free-piston Stirling engine driving a linear alternator to generate electrical power and more particularly relates to a closed loop, negative feedback control system that includes improved control loops for maintaining the mechanical power generated by the engine equal to the power transferred from the engine to the linear alternator.

2. Description of the Related Art

A free-piston Stirling engine (FPSE) driving a linear alternator is an attractive electrical power source because such sources are efficient, compact and light weight and can generate electrical power from heat energy supplied by a variety of fuels. A free-piston Stirling engine is a closed-cycle, reversible heat engine which converts heat into work by moving a confined volume of working gas between a relatively warmer heat acceptor and a relatively cooler heat rejector. The resulting alternating, cyclical, expansion and compression of the internal working gas provides an oscillating pressure wave that drives an appropriately sprung piston to oscillate substantially sinusoidally in linear reciprocation. The piston is mechanically linked to a ring of permanent magnets that it drives in reciprocation within the winding or coil of the linear alternator thereby inducing a voltage across the winding terminals. Typically, the piston of the engine is directly linked by a flange on the back of the piston to an array of axisymmetrically arranged magnets, for example arranged in a ring, and the engine and alternator are integrated into a common, hermetically sealed housing.

Many prior art electrical power sources of this type include a rectifier circuit connecting the alternator output terminals to an electrical load and also have a controller which is a control system for controlling the operating parameters of the Stirling engine and the alternator as well as the output electrical parameters. The operation of a free-piston Stirling engine and its connection to a linear alternator are described in many publications, including patents such as U.S. Pat. No. 6,871,495 which is herein incorporated by reference.

FIG. 1 is a simplified schematic diagram illustrating the electrical circuit of a prior art electrical power generating source having a linear alternator 10 driven by a free-piston Stirling engine and applying the alternator AC output to a load 12. The alternator is shown as its equivalent, lumped-element circuit. This equivalent circuit has, in series connection, an inductor 14 having inductance $L_{alt}$ representing alternator winding inductance, a lumped resistance $R_{ac}$ representing alternator resistance and an AC voltage source 16 having an induced or back emf $V_g$. The voltage $V_g$ is the open circuit voltage induced in the alternator winding by the magnets that are driven in reciprocation by the free-piston Stirling engine.

A tuning capacitor 18 is frequently connected in series with the alternator winding in order to tune out the winding inductance. The capacitance of the tuning capacitor is chosen so that, at the operating frequency of the alternator and engine, the inductive reactance of the winding and the capacitive reactance of the tuning capacitor form a series resonant circuit. Such a series resonant circuit exhibits a zero or resistive impedance. The tuning capacitor consequently provides a unity or near unity power factor which maximizes power transfer from the alternator to the electrical load and minimizes resistive heat losses. However, such tuning capacitors are bulky and expensive so it is desirable to eliminate the tuning capacitor. Also, the tuning capacitor impedance and the series inductor impedance only match at a single frequency. Therefore, with a tuning capacitor, the output power factor varies with engine operating frequency. The controller of the present invention can compensate over a wide range of frequencies, provide unity power factor or constant frequency operation.

As also illustrated in FIG. 1, the output of the alternator can be connected to the utility electrical power grid 20 and used to supply electrical power to the grid. As known to those skilled in the prior art, this arrangement results in the free-piston Stirling engine operating at the same frequency and substantially in phase with the electrical grid. This synchronous operation occurs because the engine is coupled to the alternator by the magnetic coupling between the reciprocating permanent magnets and the alternator winding. The coupling of the magnetic flux of the reciprocating magnets with the magnetic flux resulting from the alternator current, causes the alternator current to be reflected into the engine as complex damping forces acting upon the free-piston Stirling engine. These forces, which are reflected back into the engine, act upon the piston of the engine as a combination of mass, spring and damping forces. Consequently, the magnetic force generated by the alternator current acts upon the Stirling engine piston to cause the piston to run synchronously with the alternator current in the same way that a rotating synchronous electric motor, having two rotating magnetic fields, remains synchronous. If the magnetic field from the reciprocating magnets becomes advanced or retarded from the magnetic field from the alternator current, there is a magnetic force pulling them together. In the linearly reciprocating engine and alternator, the result is that the reciprocating piston of the FPSE will operate synchronously with the electrical power grid voltage, if the FPSE is designed to be mechanically resonant at or very near the power grid frequency.

FIG. 2 illustrates an electrical power generating source like that of FIG. 1 but having a common, passive, full wave rectifier 22 using four diodes arranged in an H-bridge to provide a DC output. The prior art has also substituted a full wave, switching mode rectifier, also known as an active rectifier, for the full wave diode rectifier of FIG. 2 and eliminated the tuning capacitor 24. An example of such a configuration is shown in the above cited U.S. Pat. No. 6,871,495.

A switching mode rectifier is a type of circuit that is known in the prior art and described in multiple publications. It typically has an H-bridge configuration but has controllable electronic switches, commonly MOSFETs, substituted for the diodes of FIG. 2. An active rectifier control is connected to the gate of each electronic switch and switches them ON and OFF by switching one diagonally opposite pair ON and the other OFF and alternating the pair that is ON while the other pair is OFF. This switching is done at a frequency that is much higher than the sinusoidal frequency of the FPSE and alternator. For example, the electronic switches may be switched at a rate of 10 kHz or 20 kHz while the FPSE and alternator may be operated at 60 Hz or 120 Hz. The switching control not only turns the electronic switches ON and OFF as described, but also varies the duty cycle of the electronic switches in response to a modulating input signal. Consequently, the switching control of a switching mode rectifier is essentially a pulse width modulator that includes a high frequency oscillator for alternately switching the diagonally opposite switch pairs and also modulates the duty cycle of the ON and OFF switching states that are switched at the high frequency. As a result, it is the phase of the switching of the switching mode rectifier that controls the phase of the current though the H-bridge relative to the alternator terminal voltage. That phase control by the switching mode rectifier creates the same effect on the phase as a tuning capacitor and therefore allows the tuning capacitor to be eliminated. However, because the phase control by the switching mode rectifier does not depend upon resonance, which is frequency dependent, the switching mode rectifier maintains the desired phase relationship over a range of engine operating frequencies. The pulse width modulating circuit and function can be implemented not only with analog circuits but also and more importantly using microprocessors or microcontrollers, as is preferred, and other digital logic and processing circuits that are programmed, such as with software, to perform the pulse width modulating function. Because switching mode rectifiers, summarized above, are described in prior art text books and technical literature about switch mode power supplies, switch mode inverters or switch mode motor drives, switching mode rectifiers are not explained here in more detail.

Energy for driving the FPSE is supplied from an external heat source, such as fuel combustion, solar energy or heat from radioisotope power sources, applying heat to the engine heat acceptor ("hot end"). The heat energy is converted by the engine to mechanical work energy which drives the linear alternator to convert the mechanical energy to electrical energy. It is highly desirable that the mechanical power generated by the FPSE be exactly equal to the power transferred from the FPSE to the linear alternator, most of which is ultimately transferred to the load. This balanced power condition avoids significant problems with engine operation. If the power transferred to the alternator exceeds the power generated by the FPSE, the engine will stall. If the power transferred to the alternator is less than the power generated by the FPSE, the piston stroke will increase uncontrollably and can cause damaging internal collisions and engine temperature will slowly increase over time. Piston stroke is the distance traveled by the piston between the boundaries of its reciprocation. Piston motion as a function of time can be represented as a phasor with a piston amplitude $X_P$ and is sometimes alternatively used to describe piston displacement. Piston amplitude $X_P$ has a magnitude of one half piston stroke and the two terms are sometimes used interchangeably when describing qualitative aspects of operation.

Fuel combustion systems for electrical power generating systems of this type commonly have temperature control systems that control the temperature at the engine's heat acceptor. Consequently, for relatively long term control, the mechanical power delivered from the engine to the alternator can be modulated by increasing or decreasing the thermal input power to the engine head which causes its temperature to change. However, that is an insufficient control for at least two reasons. First, the rate of temperature change that can be accomplished is relatively slow, far too slow to respond in time to prevent either engine stalling or piston over-stroking. Second, engine efficiency is strongly dependent upon heat acceptor temperature. The hotter the heat acceptor temperature at the engine head, the more efficient the engine. Therefore, modulating thermal input power and temperature not only is too slow but also reduces engine efficiency because it does not maintain the highest possible input head temperature. It is therefore desirable to provide a way to control engine output power in order to maintain the power transfer balance between the engine and the alternator, but it is desirable to do so in a way that permits the hot end temperature of the FPSE to remain at a constant maximum temperature in order to maximize engine efficiency. Although embodiments of the invention advantageously include a fuel combustion control system that maintains a constant temperature that is as hot as the engine materials can withstand, that alone is not a viable option for controlling engine power output and piston stroke and maintaining the power balance described above.

FIG. 1 also illustrates the use of a "dump" resistance 26 as another prior art way of controlling piston stroke and maintaining the power balance between the engine and the alternator. The resistance 26 is an additional electrical load that can be switched into the circuit or varied in resistance to essentially waste excess power produced by the engine. However, this is obviously undesirable because it simply dissipates excess power produced by the engine in order to maintain the power balance and consequently reduces efficiency by wasting heat energy and therefore wasting fuel.

The prior art has recognized that the power out from a FPSE can be controlled by controlling piston stroke because the power produced by a FPSE is approximately proportional to the square of the piston stroke. However, the voltage induced in the alternator is proportional to stroke and most electrical loads require a stable, constant voltage, such as 24 vdc or 28 vdc or 115 vac. Consequently, it is a problem to design a control system that accomplishes both (1) matching the power delivered to the alternator by the FPSE to the power demanded by the electrical load plus electrical losses; and (2) maintaining a constant output voltage. The problem is that, if the electrical power demand of the electrical load decreases and the stroke is decreased to reduce FPSE power, the induced voltage drops. Conversely, if an increased electrical power demand results in an increased stroke to provide more power from the FPSE, the output voltage also increases. It is therefore desirable to modulate the power from the FPSE to match electrical load power while reducing or eliminating voltage variations at the electrical load that result from variations in load power demand.

Additionally, there is a need for a manner of controlling piston stroke by a feedback control system that can more quickly detect variations in operating parameters that lead to variations in piston stroke from the commanded or desired piston stroke and that can quickly respond to the detected variations so that the actual piston stroke is maintained within boundaries that are narrower and closer to the commanded piston stroke.

Therefore, it is an object and feature of the present invention to provide an improved way of controlling piston stroke in order to match mechanical power produced by the engine to mechanical power transferred from the engine to the alternator.

A further object and feature of the invention is to control piston stroke based upon an operational parameter that can be more easily and more quickly controlled thereby permitting control of piston stroke, and therefore of power balance, within closer tolerances.

A further object and feature of the invention is to combine the piston stroke control with additional circuitry and feedback control loops to provide improved voltage regulation so that the FPSE can be operated over a wide range of piston stroke for maintaining the balance of the engine power transferred to the alternator and yet still provide a constant, well regulated output voltage to the electrical load over a wide range of load power consumption.

BRIEF SUMMARY OF THE INVENTION

The invention is a controller and a method for controlling the piston stroke of a free-piston Stirling engine driving a linear alternator so that the mechanical power generated by the engine is maintained equal to the power transferred to the linear alternator. The invention has a feedback control loop (termed the $V_{internal}$ control loop) that senses operating parameters of the engine and alternator, computes a sum (termed $V_{internal}$) of operating parameters, at least one of which can not be directly sensed, and uses that sum as the feedback signal in the control loop so that the feedback control loop drives the computed sum to a commanded value ($V_{internal\ cmd}$) for that sum. One pair of computed operational parameters that can be computed and summed are the induced or back emf (termed $V_g$) of the alternator and the voltage drop (termed $V_{Rac}$) across the lumped sum resistance of the alternator, both of which are operating parameters of components of the equivalent circuit for the alternator. An alternative pair of operational parameters that can be computed and summed to compute $V_{internal}$ are the terminal voltage $V_T$ and the voltage drop $V_{Lalt}$ across the alternator winding. The output of the $V_{internal}$ feedback control loop controls the alternator current by generating a current command input, $I_{cmd}$, that is applied to a current controlling feedback control loop that controls the pulse width modulation of a switching mode rectifier connected between the alternator terminals and an energy storing capacitor, a battery or other suitable electrical energy storage means. The commanded input, $V_{internal\ cmd}$, to the $V_{internal}$ control loop is generated by one or more additional, outer control loops, the choice or selection of which depends upon the application of the invention including the type of output that is desired and how the designer wants to control it.

BRIEF DESCRIPTION OF THE SEVERAL VIEWS OF THE DRAWINGS

FIG. 1 is a schematic and block diagram of a prior art alternator, alternator output circuit and load for supplying AC power out.

FIG. 2 is a schematic and block diagram of a prior art alternator, alternator output circuit and load for supplying DC power out.

Figure 3:
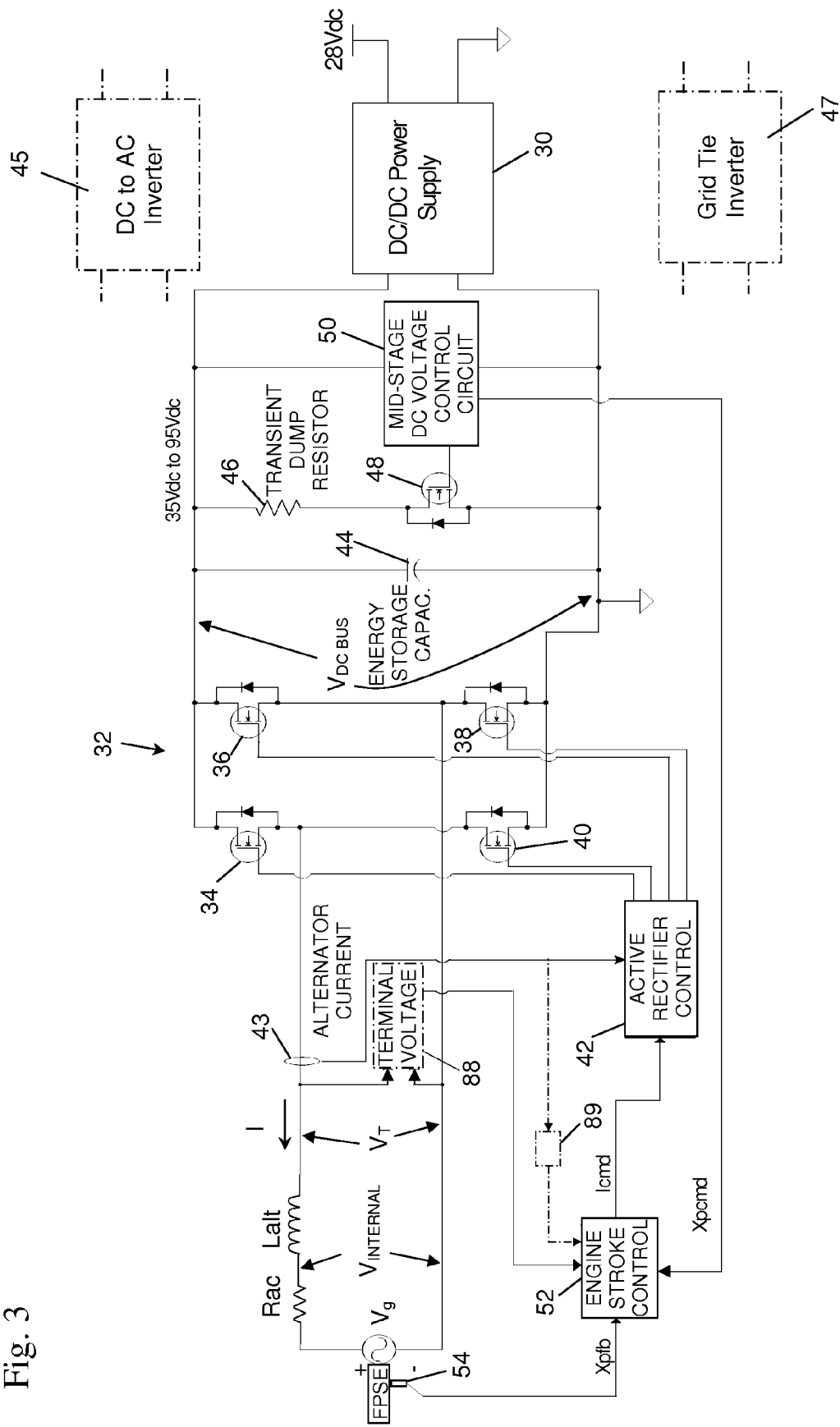
FIG. 3 is a schematic and block diagram of an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

The apparatus of the invention is an improved, free-piston Stirling engine driving a linear alternator having its output current controlled by a switching mode rectifier where the improvement comprises a combination of particular negative feedback control loops controlling the switching mode rectifier. The concepts of the invention are best illustrated by means of a feedback control loop diagram of the type that those skilled in the feedback control art are familiar with. However, the feedback control loop diagram can be better understood if preceded by an explanation of an embodiment of the physical circuitry that is represented by the feedback control loop diagram. This description of the invention includes several variables and parameters and they are collected together and defined at the end of this description.

FIG. 3 is a schematic diagram of an embodiment of the invention. The alternator that is driven by the free-piston Stirling engine is, as in FIGS. 1 and 2, shown as its equivalent, lumped-element circuits $V_g$, $R_{ac}$, and $L_{alt}$ having a terminal voltage $V_T$. The instantaneous value of voltage $V_g$ is directly proportional to the instantaneous piston velocity and they are related by an experimentally determined proportionality constant which is the open circuit linear alternator motor constant $\alpha$. Piston velocity is directly proportional to piston stroke. The terminal voltage $V_T$ is less than $V_g$ by the amount of voltage drop across the impedances $R_{ac}$ and $L_{alt}$.

The alternator terminals are connected to an H-bridge of a full wave switching mode rectifier 32 consisting of four power MOSFETs 34, 36, 38 and 40 and a control circuit 42, identified as an Active Rectifier Control. Although not shown in FIG. 3, the active rectifier control circuit 42 includes a closed loop, negative feedback current control system that controls a pulse width modulator within the control circuit 42. The pulse width modulator controls the switching of the four MOSFETs 34, 36, 38 and 40 in the manner known to those skilled in the art and summarized above. As will be more fully described, the current control loop controllably varies the duty cycle of the pulse width modulator. The feedback signal for the current control loop is obtained from an alternator current sensor 43 that applies a signal representing the alternator current to the alternator current control circuit within the control circuit 42. Although not as effective, a half wave, switching mode rectifier can alternatively be used.

The output from the switching mode rectifier 32 is applied, in preferred embodiments, to an energy storage capacitor 44. However, a storage battery may be substituted for or inserted parallel to the capacitor 44. Other types of devices can be used if they are able to store electrical energy under static conditions such as in the form of electrical charge. The two most practical devices currently known which can be used are a capacitor and a battery. Another device can be used if it allows an electrical current to be passed through the device to incrementally increase the stored energy, retains its stored energy in the absence of an electrical current and allows the energy to be recovered in the form of electrical current through a load attached to the device. For example, such a device would be a motor/alternator with an attached flywheel for storing energy. Because there are alternative energy storage devices that can be used, the term "electrical energy storage means" is used to refer to devices that meet these criteria for alternative implementations of the invention.

A conventional voltage regulating circuit 30, identified as a DC/DC Power Supply, has its input connected across the energy storage capacitor 44. The voltage regulating circuit 30, operates in the manner known to those skilled in the art to provide an output at a constant voltage despite variations in the mid-stage voltage across the energy storage capacitor 44. There are a variety of conventional circuits that can be substituted as alternatives for the regulating circuit 30 to provide output electrical power having a variety of different characteristics. For example, an inverter 45 can be substituted in order to provide an AC output for a useful load or a grid tie circuit 47 can be substituted to connect the output to the power grid. Additionally, the regulating circuit can be eliminated for supplying less regulated DC power, such as for battery charging.

The circuit of FIG. 3 additionally has a power dumping circuit connected parallel to the energy storage capacitor 44 and consisting of a transient dump resistor 46 serially connected to a power MOSFET 48. A mid-stage voltage control circuit 50 is also connected across the energy storage capacitor 44 and senses the voltage across that capacitor. One function of the mid-stage voltage control circuit 50 is to turn ON the MOSFET 48 if the voltage across the capacitor 44 exceeds a predetermined, selected, excessive level, such as 95 vdc, in order to allow excess energy transferred from the Stirling engine to be consumed and thereby prevent the Stirling engine from over-stroking and colliding in the event that the mid-stage voltage across the capacitor 44 becomes excessive. Such an excessive mid-stage voltage can occur if an electrical load is suddenly removed causing a step function reduction in consumed power. This power dumping circuit is needed only during the transient period following the step function change in the output load and until the remaining control circuit accommodates the change and comes to a steady state condition.

Figure 5:
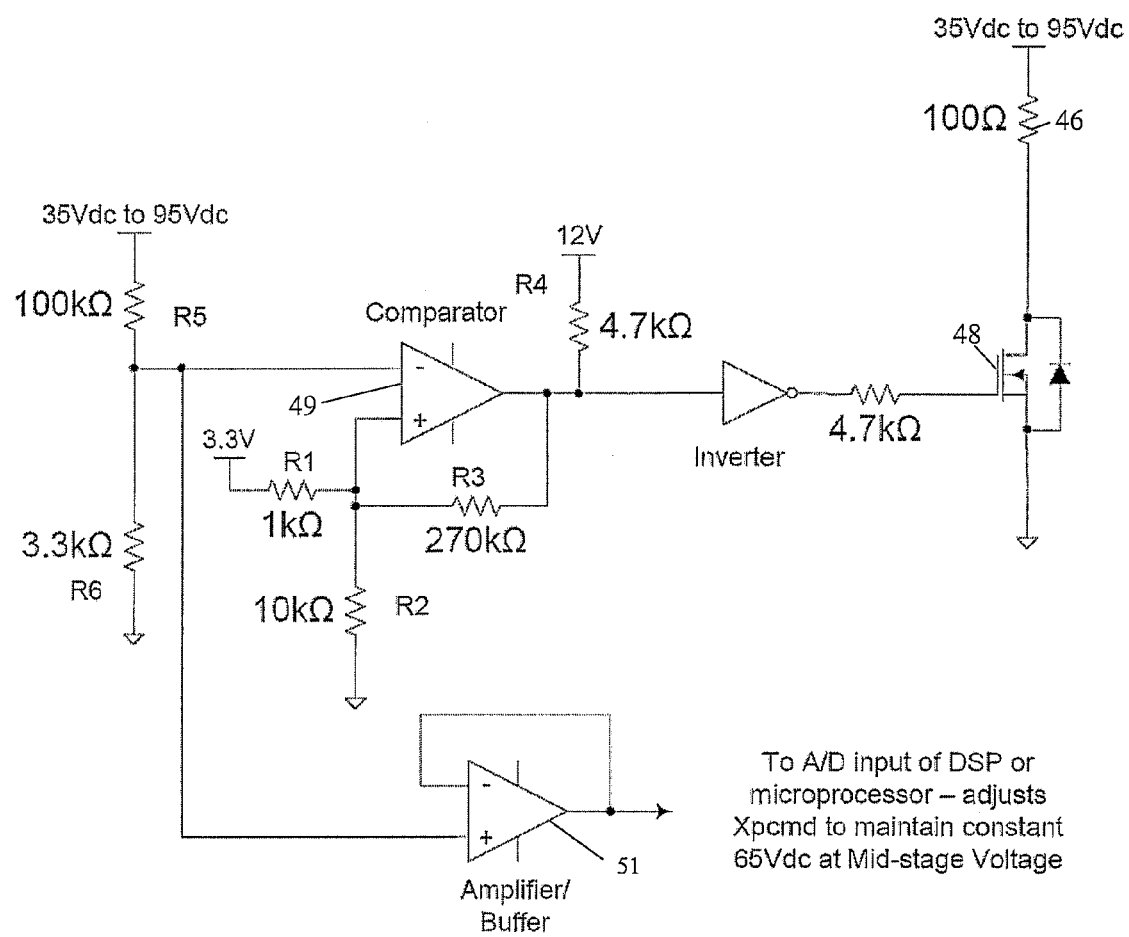
FIG. 5 is a schematic diagram of the mid-stage voltage control circuit 50 of FIG. 3.

Because of the space limitations, the mid-stage voltage control circuit 50 is separately illustrated in FIG. 5. Resistors R5 and R6 form a voltage divider that divides the mid-stage voltage $V_{DC\ Bus}$ across the energy storage capacitor 44 (FIG. 3) down to something close to 3.3V max. This reduced voltage is then used in two places. First, the reduced voltage is used to control the over-voltage protection power dumping circuit consisting of the transient dump resistor 46 serially connected to the power MOSFET 48. When the reduced mid-stage voltage is greater than about 3.0V (corresponds to a mid-stage voltage of 95 Vdc), the output of the comparator 49 changes from high to low. This signal is then inverted, turning on the MOSFET 48 and dump resistor 46, which discharges the energy storage capacitor 44 (FIG. 3) and protects the power components from damage due to overvoltage. Once the output of the comparator 49 has gone low, it remains low until the reduced mid-stage voltage drops below about 2.7V (corresponds to a mid-stage voltage of 85 Vdc). The comparator output then returns high and MOSFET 48 is turned off.

Returning to FIG. 3, importantly, the mid-stage voltage control circuit 50 also provides a commanded piston stroke, $X_{Pcmd}$, to a closed loop, negative feedback control 52 for controlling piston stroke. This control loop will be discussed further in connection with FIG. 4 and receives a feedback signal, representing the sensed piston stroke $X_{Pfb}$, from a sensor 54 mounted to the FPSE. The sensor 54 can be either a piston position sensor, which is preferred, or a piston velocity sensor. The prior art has disclosed examples of such sensors. The commanded piston stroke, $X_{Pcmd}$, provided by the mid-stage voltage control circuit 50, is derived from the voltage divider that comprises resistors R5 and R6 shown in FIG. 5 and described above. First, it is buffered by the amplifier/buffer 51 (and can be filtered and scaled, not shown) and sent to the DSP or microprocessor A/D input of the engine stroke control 52 (FIG. 3). This mid-stage voltage value is used to adjust $X_{pcmd}$ up or down; lower $X_{pcmd}$ if the mid-stage voltage is greater than 65 Vdc and higher $X_{pcmd}$ if the mid-stage voltage is less than 65 Vdc.

The engine stroke control loop 52, has an output that is a commanded instantaneous value, $I_{cmd}$, of alternator current that is applied as a command input to the current control loop in the active rectifier control 42. That current control loop is briefly described above and is described in more detail in connection with FIG. 4.

Figure 4:
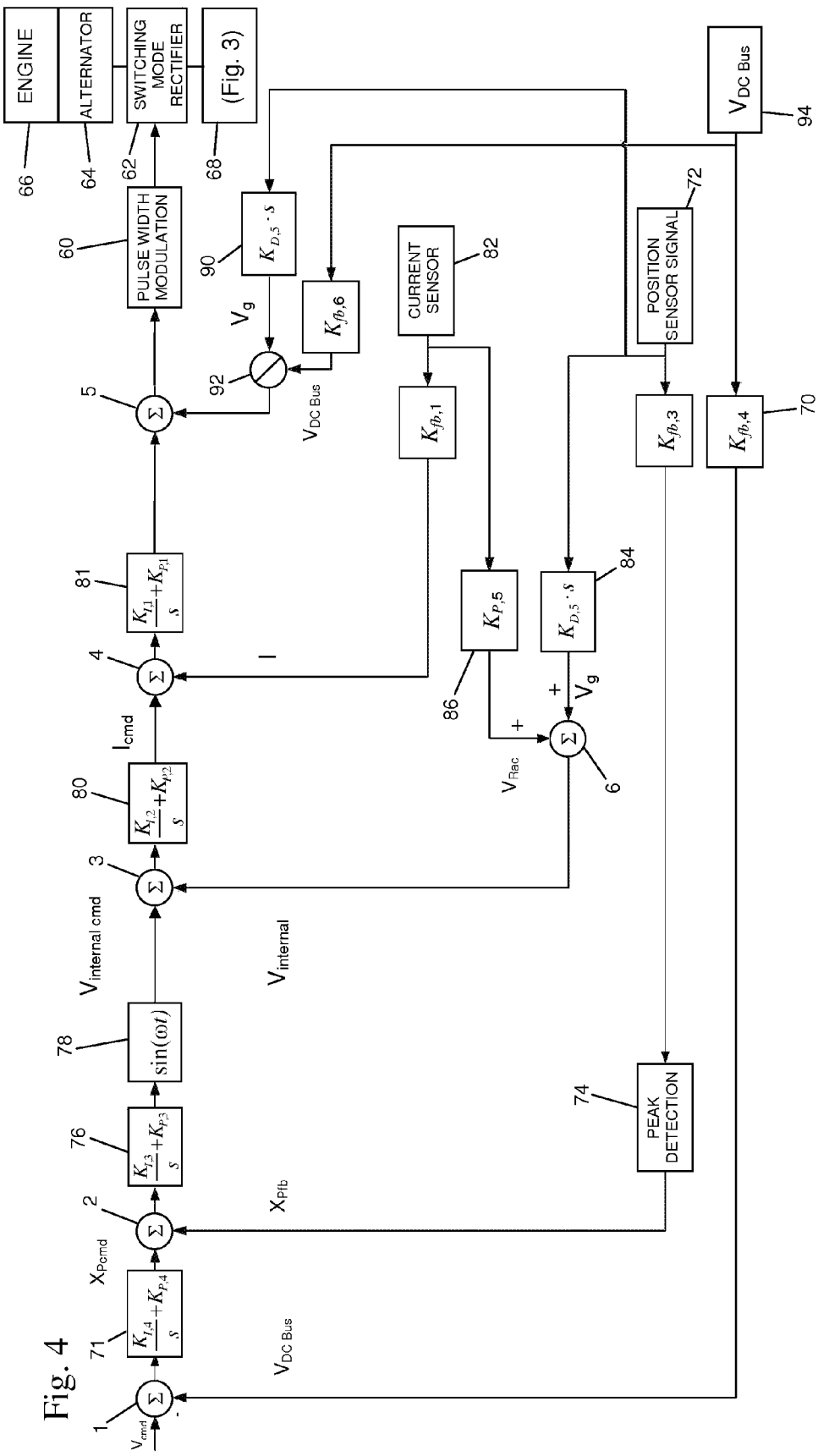
FIG. 4 is a negative feedback control system transfer function diagram illustrating the preferred embodiment of the invention.

FIG. 4 is a diagram of a closed loop, negative feedback control system that is embodied in the circuit of FIGS. 3 and 5 and can, of course, be embodied in other hardware implementations. As known to those skilled in the control system art, a closed loop, negative feedback control system has a forward loop and a feedback loop. In the forward loop, a command input is applied to a summing point (or summing junction). The command input is a signal representing a desired (commanded) value of an operating output variable parameter that is being controlled. The feedback loop has a sensor for measuring the actual value of that output parameter and applies a signal representing that actual value to the summing point. The output of the summing point provides an error signal representing the difference between the desired value and the measured value of the controlled parameter. That error signal is applied to one or more forward control elements each of which is represented by a forward transfer function, which is a mathematical expression relating its input to its output. The mathematical expressions are advantageously Laplace transform expressions which tell an engineer skilled in the art the operating characteristics of the elements in the control system and therefore how to construct hardware implementations of them. Ordinarily, of course, there are multiple ways known to those skilled in the art to implement each element in the control system so long as they perform the transfer function described by their mathematical expressions.

As also known to those skilled in the control system art, closed loop, negative feedback control systems are not limited to a single feedback loop, a single summing point or a single forward control element. It is common to include multiple feedback loops, summing points, forward control elements and other elements in a control system. Commonly, control loops are nested within other control loops.

Persons skilled in the control system art also recognize that such control systems can be implemented with analog or digital circuits and combinations of them. The mathematical operations described in the diagram of a control system are desirably implemented with any of a variety of commercially available microprocessors, microcontrollers or other computing circuits. As known in the current state of the art, analog circuit and mathematical operations can be economically performed by software programmed digital circuits having software algorithms that simulate analog circuit operations and perform mathematical operations. Many of these operations can be performed by discrete logic, programmable logic array (PLA), programmable gate array (PGA) or digital signal processor (DSP) implementations, as well as by microprocessors or microcontrollers. Therefore, the term "controller circuit" generically includes the known types of analog and digital logic control implementations that can be used to implement a control circuit. The term "computing circuit" refers to circuit implementations utilizing such circuits for transforming an electrical signal in accordance with a mathematical operation or algorithm.

Referring now to FIG. 4, each of the multiple control loops of the preferred embodiment illustrated in FIG. 4 is identified by a reference numeral, 1 through 5, associated with its summing point. An additional summing point 6 is within loop 3. The ultimate output of all the nested control loops is applied to a pulse width modulator 60 that controls the duty cycle of the switches of a switching mode rectifier 62 in the manner previously described. The forward loop signal passing across the top of the diagram along the forward elements of the multiple control loops essentially represents the duty cycle of the switching mode rectifier switches. This duty cycle controls alternator current. Each of the multiple control loops adjustably controls this duty cycle signal in response to each particular loop's feedback signal and the consequent error signal generated at its summing point. As described in connection with FIG. 3, the switching mode rectifier 62 is connected to the winding of an alternator 64 that is driven by a Stirling engine 66. The output of the switching mode rectifier 62 is connected to an output circuit 68, such as illustrated in FIG. 3, and includes an energy storage device, may include a regulator circuit and ultimately connects to an electrical load.

The outermost control loop 1 controls the mid-stage voltage $V_{DC\ Bus}$ according to negative feedback control principles. Its command input, $V_{cmd}$, is a signal representing the desired value of the mid-stage voltage $V_{DC\ Bus}$. The circuit can be designed to permit $V_{cmd}$ to be manually selected or, preferably, its value is fixed in the circuit or software based upon the particular application and the desired, design value of the mid-stage voltage $V_{DC\ Bus}$. The feedback signal for this mid-stage voltage control loop 1 is obtained, as explained above, from a voltage sensing circuit in the DC voltage control circuit 50 (FIGS. 3 and 5) that senses $V_{DC\ Bus}$ and applies a signal representing it through a constant multiplier 70 to the summing point 1. The error signal from summing point 1 is integrated and amplified (multiplied) by the forward control element 71 as shown by its transfer function as is well known in the feedback control system art. The mid-stage voltage control loop 1 performs a voltage regulator function by controlling and maintaining the bus voltage $V_{DC\ Bus}$ within acceptable limits. The output of the mid-stage voltage control loop 1 is applied to the subsequent piston stroke control loop 2 as a piston stroke command input $X_{Pcmd}$. Piston stroke controls mid-stage bus voltage because piston stroke controls engine power output. If $V_{DC\ Bus}$ is reduced, the reason is an increased electrical load demand that drains more energy from the energy storing capacitor than is being supplied by the alternator. Consequently, more power and greater stroke is needed to raise and restore the $V_{DC\ Bus}$ voltage. Conversely, an increase of $V_{DC\ Bus}$ results from a decreased load and requires a decrease in piston stroke so the engine provides less power to the alternator.

The second negative feedback control loop 2 controls piston stroke, $X_P$, according to negative feedback control principles. The feedback loop of the piston stroke control loop 2 has a piston position sensor 72 mounted or connected to the Stirling engine to provide a piston position signal. The piston position sensor 72 corresponds to the sensor 54 in FIG. 3 and may be of a type known in the art for providing a signal representing the instantaneous position of the piston. Alternatively, a piston velocity sensor can be used and its output integrated with respect to time to obtain a piston position signal. Because the piston motion is substantially sinusoidal, the piston position sensor 72 provides a substantially sinusoidal signal representing sinusoidal displacement of the piston as a function of time. The amplitude of the piston position sensor output represents the amplitude of piston linear oscillation. In the preferred embodiment, the output of sensor 72 is multiplied by a constant $K_{fb,3}$ and applied to a peak detector 74. The peak detector 74 detects the peak to peak value (i.e. the envelope) of the sinusoidal displacement signal and this peak to peak value of the piston displacement signal represents the measured value, $X_{Pfb}$, the piston stroke. The measured piston stroke $X_{Pfb}$ is applied as the feedback signal to the summing point 2, along with the commanded stroke signal $X_{Pcmd}$ to provide an error signal that is applied to the forward control element 76. This forward control element 76 integrates and amplifies the error signal in the manner known in the art. The output of the forward control element 76 is applied to a sinusoidal function generator 78 having a modulatable amplitude that is modulated by the signal from the forward control element 76. The frequency $\omega$ of the sinusoidal function generator 78 is fixed at or near the resonant frequency of the Stirling engine and, in the illustrated embodiment, is the designed operating frequency of the Stirling engine and alternator. Although these operations are preferably performed digitally using conventional programming algorithms, the effect is to apply, to the summing point 3 of the next negative feedback control loop, a sinusoid having an amplitude that is proportional to the output signal from the forward control element 76. This sinusoid is the commanded value $V_{internal\ cmd}$ of the circuit parameter $V_{internal}$. This circuit parameter is a critical part of the present invention and will be discussed in considerably more detail below.

The third, negative feedback, control loop having summing point 3 controls the instantaneous value of $V_{internal}$. The definition, operation and significance of $V_{internal}$ and the feedback loop for the $V_{internal}$ feedback control loop will be described below after describing the remaining control loops. The error signal from the summing point 3 of the $V_{internal}$ feedback control loop is applied to a forward control element 80 which integrates and amplifies the error signal to generate a sinusoidal commanded current, $I_{cmd}$, for the next control loop.

The fourth, negative feedback, control loop controls the instantaneous value of the alternator current and has summing point 4 to which the commanded current $I_{cmd}$ is applied. The feedback loop for this alternator current control loop has a current sensor 82 that corresponds to the current sensor 43 of FIG. 3. The output signal from the current sensor 82 is multiplied by $K_{fb,\ 1}$ and applied to the summing point 4 as a sinusoidal signal representing the instantaneous alternator current I. The error signal from the summing point 4 of the alternator current feedback control loop is applied to a forward control element 81 which integrates and amplifies the error signal.

The fifth control loop, which includes summing point 5, is a feed forward loop. The operation of feed forward loops is known to those skilled in the art. The feed forward loop illustrated in FIG. 4 is not necessary for the invention but enhances operation of the preferred embodiment and is used for purposes already known in the prior art. Generally, the recognized purpose of a feed forward loop is to sense one or more circuit disturbances, anticipate and predict changes in a controlled variable and use the sensed signals to makes process or operational changes before the controlled variable is affected by the disturbances. In the preferred embodiment illustrated in FIG. 4, the principal fed forward signal is the induced alternator voltage $V_g$ and less importantly the mid-stage voltage $V_{DC\,Bus}$. The $V_g$ signal is derived from the piston position sensor signal 72 by differentiation to derive piston velocity and multiplication by the motor constant $\alpha$ at element 90 and then applied to divider 92. The $V_{DC\,Bus}$ signal is obtained from the same $V_{DC\,Bus}$ sensor 94 previously described and used for the $V_{DC\,Bus}$ feedback signal for the mid-stage voltage control loop 1. It is multiplied by $K_{fb,\,6}$, and applied to the divider 92. The output of the divider 92 is $V_g$ divided by $[V_{DC\,Bus} \times K_{fb,\,6}]$. That dividend essentially represents duty cycle. Consequently, this feed forward loop senses disturbances in the form of changes in $V_g$ and in $V_{DC\,Bus}$ and modifies the duty cycle and therefore the alternator current to maintain the same $V_g$ and $V_{DC\,Bus}$ without waiting for the negative feedback current control loop 4 to respond. The division by divider 92 means that an increase in $V_g$ increases the duty cycle and therefore the alternator current and an increase in $V_{DC\,Bus}$ decreases the duty cycle and therefore the alternator current.

The sinusoidal output from the summing point 5 of the feed forward loop (or from forward element 81 if the feed forward loops is omitted) provides a control signal at the frequency $\omega$ that is applied to the pulse width modulator 60 and controls the duty cycle of the switching of the switching mode rectifier 62 at the high frequency rate. The duty cycle of the switches of the switching mode rectifier is proportional to the instantaneous value of this sinusoidal control signal at each time of switching. Therefore, the duty cycle of the ON and OFF states of the high frequency switching of the switching mode rectifier varies across the low frequency cycles of the alternator operating frequency $\omega$ in proportion to the instantaneous value of the sinusoidal output signal from the summing point 5, as known in the art of switching mode rectifiers. More specifically (with reference to FIG. 3), over one half cycle of the low frequency $\omega$, the duty cycle of the ON time for one pair of diagonally opposite switches 36 and 40 varies from 50% at zero cross over of the sinusoidal control signal to a maximum at the peak of the sinusoidal control signal. Over the next half cycle, the duty cycle of the ON time for the other pair of diagonally opposite switches 34 and 38 varies from 50% at zero cross over of the sinusoidal control signal to a maximum at the peak of the sinusoidal control signal.

The use of $V_{internal}$ for controlling the FPSE is central to the present invention. Referring to FIG. 3, $V_{internal}$ is defined as the sum of the voltage $V_g$ and the voltage $V_{Rac}$ across the lumped sum resistance $R_{ac}$ of the alternator equivalent circuit. However, because the voltages across these equivalent circuit elements are not independently accessible for sensing, their instantaneous values must be computed from other accessible and sensed values. Referring to FIG. 4, the value of $V_g$ is computed from the piston position sensor 72 based upon the relationship that the open circuit induced voltage $V_g$ is equal to the piston velocity multiplied by the motor constant $\alpha$. The piston position signal is differentiated to derive piston velocity and multiplied by the motor constant $\alpha$, as shown at element 84, to provide a signal representing $V_g$. The constant $K_{D,\,5}$ shown in element 84, is the motor constant $\alpha$. This signal representing $V_g$ is applied to a summing point 6. In order to compute $V_{Rac}$, element 86 multiplies the sensed current signal from the current sensor 82 by the value of $R_{ac}$, with $K_{P,\,5}$ being the value of $R_{ac}$. The computed value of $V_{Rac}$ is also applied to summing point 6. Therefore, the output of summing point 6 is the sum $V_g + V_{Rac}$ and is the "measured" computed instantaneous value of $V_{internal}$ for the $V_{internal}$ control loop 3. This $V_{internal}$ signal is the output of the feedback loop for the closed loop, negative feedback control loop that controls $V_{internal}$.

There are alternative ways of computing $V_{internal}$ using signals derived from other operating variables of the system. In the way described above, the piston position signal is differentiated to derive piston velocity and multiplied by the motor constant $\alpha$, as shown at element 84, to provide a signal representing $V_g$. As an alternative, instead of differentiating a piston position signal to derive piston velocity, a piston velocity sensor can be used with its output multiplied by the motor constant $\alpha$ to provide a signal representing $V_g$. To implement that, instead of connecting the output of the position sensor 72 to the element 84 and applying the result to summing point 6, the output of a piston velocity sensor is applied to an element like element 84 with the K that represent the motor constant $\alpha$ but without any differentiation (without the Laplace operator s) and its output applied to the summing point 6.

It will be apparent to those skilled in the electronics art that a simple application of Kirchoff's second law (summing voltages around a closed loop) shows that $V_g$ can, as yet another alternative, be computed by sensing the voltage $V_T$, for example with a voltage sensing circuit 88 illustrated in phantom in FIG. 3, and subtracting the voltage across the alternator inductance, $L_{alt}$. As those skilled in the art will be aware however, the addition and subtraction mathematical operations are algebraic summing operations and whether they are sums or differences is dependent upon the sign conventions that are adopted. For application of this alternative way of computing $V_{internal}$, the elements 84 and 86 are omitted. Instead, one input to the summing point 6 is the sensed alternator terminal voltage $V_T$ from voltage sensor 88 (FIG. 3). The other input is derived by differentiating, at element 89 (FIG. 3), the current signal from the current sensor 82 (43 in FIG. 3) with respect to time to derive di/dt, multiplying di/dt by the inductance L of the alternator and applying the result as a second input to the summing point 6.

Because there are alternative operating variables of the system that can be sensed and used, in addition to the sensed alternator current, to compute $V_{internal}$, the term "sensor means" is used to generically designate alternative sensors that can be used, in addition to a current sensor, to equivalently compute $V_{internal}$. Those described above are a piston position sensor, a piston velocity sensor and a terminal voltage sensor for sensing the voltage $V_T$.

The most important aspect of the invention is that piston stroke is controlled from $V_{internal}$ rather than $V_g$ or some other circuit variable. Controlling from $V_{internal}$ means that the feedback loop of the negative feedback control loop 3 uses, as its "measured" feedback signal, an instantaneous value of $V_{internal}$ rather than $V_g$ or some other circuit variable. This gives the advantage of tighter control (i.e. within closer tolerances) than other fed back variables for the reason now described.

In the following discussion it should be borne in mind that the $V_{internal}$ control loop 3 and the subsequent loops are operating with instantaneous values across the low frequency cycles of the Stirling engine and alternator. Further, it should be borne in mind that the switching mode rectifier, which controls alternator current, is switching at the high frequency rate. Therefore, there may be on the order of 80 to 400 switching cycles of the switching mode rectifier over each low frequency cycle of the engine and alternator, with the duty cycle of each high frequency switching cycle determined by the instantaneous value of the sinusoidal control signal from summing point 5 at the time of switching. As a result, these negative feedback control loops can respond and make adjustments at a rate far higher than the low frequency operating frequency of the engine and alternator. Adjustments can be made within a small interval of a low frequency cycle.

Piston stroke is adjusted by temporarily reducing or increasing alternator current to allow a piston stroke change. This is based upon the relationship of alternator current to the force exerted upon the piston by the magnetic field generated by the alternator current. Specifically, a damping force is exerted on the piston that is directly proportional to the alternator current and the proportionality constant is the motor constant α. Temporarily reducing the alternator current results in less damping force and therefore less mechanical load upon the piston which allows the piston stroke to increase. Temporarily increasing the alternator current results in a greater damping force applied to the piston and therefore a greater mechanical load upon the piston which reduces the piston stroke. After the stroke changes, the system comes to a new equilibrium at the higher or lower piston stroke and therefore at a higher or lower power output with the power output from the engine again equal to the power transferred from the engine to the alternator. However, it is desirable that these changes are able to occur at a rate much higher than the operating frequency of the engine; that is within a time interval far less than the period of the oscillations of the engine reciprocations.

The piston of the Stirling engine follows $V_{internal}$ and the piston stroke is controlled by alternator current. $V_{internal}$ is the sum of $V_g + V_{Rac}$ and these voltages are in phase because neither $V_g$ nor the resistance $R_{ac}$ includes a reactive component. However, the inclusion of the voltage $V_{Rac}$ across $R_{ac}$ as a component of $V_{internal}$ allows changes in $V_{internal}$ to be more quickly sensed thereby allowing the $V_{internal}$ control loop 3 to respond more quickly (sooner).

The reason control from $V_{internal}$ allows tighter control of piston stroke to within closer boundaries around $V_{internal\ cmd}$ may be explained by first comparing control from $V_{internal}$ to control from $V_g$. Changes in $V_g$ occur more slowly because $V_g$ is proportional to piston velocity and piston velocity changes slowly because of the mass and inertia of the piston, the magnets and magnet support attached to the piston and the springs acting upon them. Because of the mass of this oscillating piston, it takes an engine cycle or two for instantaneous piston velocity (at a corresponding point in its cycle) to change appreciably. Therefore, over a few PWM switching cycles, $V_g$ is essentially constant.

However, any change in alternator current will be immediately reflected in a change of the voltage $V_{Rac}$ across the alternator resistance $R_{ac}$. Consequently, because $V_{internal} = V_g + V_{Rac}$, any change in alternator current will be immediately reflected in a change of $V_{internal}$ even though $V_g$ remains constant for a cycle or two of engine operation. Sensing changes in alternator current is important because alternator current is controlling piston stroke. A change of the voltage $V_{Rac}$ across resistance $R_{ac}$ will be sufficient to be sensed and responded to by the control loop within a very small portion of a period of the engine operating frequency. This contrasts with the requirement of one or two engine operating periods being required for a change in $V_g$ to occur that is sufficient to be sensed and responded to by the control loop. Since $V_{internal}$ is the sum of $V_g$ and $V_{Rac}$, using $V_{internal}$ to control the current and therefore the stroke, allows the negative feedback control loop to respond to changes that occur at the high frequency switching rate rather than being confined to responding to changes that occur at the low frequency engine operating frequency. The result is that the invention provides a quicker response to small changes in alternator current and therefore permits control of piston stroke within closer or tighter boundaries. The $V_{internal}$ control loop responds at a rate of a few kHz.

The manner in which changes in $V_{internal}$ controls changes in alternator current can be seen from the equivalent circuit for the alternator illustrated in FIG. 3. The sum of the voltages around the circuit loop consisting of $V_g$, $R_{ac}$ and $V_{internal}$ must be zero, according to Kirchoff's second law. Consequently, a reduction in $V_{internal}$ means an increase in current through $R_{ac}$ because $V_g$ is essentially constant over a cycle of the high switching frequency of the switching mode rectifier. Conversely, an increase in $V_{internal}$ means a decrease in current through $R_{ac}$. The $V_{internal}$ control loop 3 and the current control loop 4 are responsive at the high frequency rate. Therefore, a circuit embodying those two feedback control loops are able to respond to small, incremental changes that occur in a small fraction of a low frequency cycle of the engine and thereby maintain tighter control of piston stroke and power balance.

Representative Values of K Constants

The invention illustrated in FIG. 4 can be embodied in differing circuits having differing values of the K constants. However, as an example, a representative set of values is given in the following table:

$K_{I,4} = 6.3$
$K_{P,4} = 0.05$
$K_{I,3} = 126$
$K_{P,3} = 0.1$
$K_{I,2} = 739$
$K_{P,2} = 0.2$
$K_{I,1} = 860$
$K_{P,1} = 8.55$
$K_{D,5} = 15$
$K_{fb,6} = 1$
$K_{fb,1} = 1$
$K_{P,5} = 1.7$
$K_{D,5} = 15$
$K_{fb,3} = 1$
$K_{fb,4} = 1$

Parameter Definitions

α linear alternator motor constant which relates open circuit alternator voltage to piston velocity and relates alternator current to force on the piston is $$\alpha = \frac{v(\text{alternator} - \text{voltage})[\text{volts}]}{V(\text{piston} - \text{velocity})[\text{meters/sec}]} = \frac{\text{force[newtons]}}{\text{current[amps]}}$$

Actual terminal voltage is a function of current flowing through the alternator because of the internal impedance of the alternator coil. Since piston stroke is proportional to piston velocity, voltage is proportional to stroke at a constant frequency.

$V_{cmd}$ the commanded voltage, $V_{DC\ Bus}$, across the energy storage capacitor.

$V_{DC\ Bus}$ the DC voltage across the storage capacitor or battery.

$X_{Pcmd}$ commanded piston stroke.

$X_{Pfb}(t)$ the instantaneous piston position as a function of time.

$X_{Pfb}$ the feedback piston stroke/amplitude signal. It is proportional to the peak to peak or zero to peak (amplitude) of the instantaneous piston position $X_{pfb}(t)$.

$V_g$ the instantaneous, open circuit voltage induced on the alternator winding (the back emf voltage).

$V_{Rac}$ the instantaneous voltage across the lumped resistance of the alternator.

$V_{Lalt}$ the instantaneous voltage across the alternator inductance.
$V_T$ the alternator terminal voltage.
$V_{internal\ cmd}$ commanded $V_{internal}$
$V_{internal}$ instantaneous sum of $V_g + V_{Rac}$.
$I_{cmd}$ instantaneous, commanded alternator current
I alternator current
s Laplace operator designating differentiation
1/s Laplace operator designating integration While certain preferred embodiments of the present invention have been disclosed in detail, it is to be understood that various modifications may be adopted without departing from the spirit of the invention or scope of the following claims.

The invention claimed is:

1. A method for controlling an electrical power generating source that comprises a free piston Stirling engine including a power piston driving a linear alternator including an alternator winding, the method comprising controlling the stroke of the piston by:
   (a) generating a sinusoidally varying commanded $V_{internal}$ input signal at the operating frequency of the Stirling engine, the input signal having an amplitude generated by a piston stroke feedback control loop;
   (b) continuously sensing at least two operational parameters of said source and computing, from the operational parameters, the instantaneous value of $V_{internal}$, wherein $V_{internal}$ is the sum of the voltage induced on the alternator winding and the voltage across the lumped resistance of the alternator winding; and
   (c) driving the sensed and computed value of $V_{internal}$ to the commanded value of $V_{internal}$.

2. A method in accordance with claim 1 wherein the step of driving the sensed and computed value of $V_{internal}$ to the commanded value of $V_{internal}$ further comprises:
   (a) generating a current command signal from a feedback control loop having the commanded $V_{internal}$ input signal as its command input and the computed instantaneous value of $V_{internal}$ as its feedback signal;
   (b) sensing the instantaneous alternator current; and
   (c) pulse width modulating the duty cycle of a switching mode rectifier connecting the alternator winding to an energy storage capacitor or battery from the output of a current feedback control loop having the sensed instantaneous alternator current as its feedback signal and the current command signal as its command input.

3. A method in accordance with claim 2 wherein the step of sensing and computing the instantaneous value of $V_{internal}$ further comprises:
   (a) sensing the instantaneous alternator current and multiplying the sensed alternator current signal by a constant representing the equivalent lumped resistance of the alternator winding to provide a signal representing the voltage drop across the lumped resistance of the alternator winding;
   (b) sensing the instantaneous piston position and differentiating the sensed instantaneous piston position signal to compute piston velocity; and
   (c) summing the sensed signals to obtain a signal representing $V_{internal}$.

4. A method in accordance with claim 2 wherein the step of sensing and computing the instantaneous value of $V_{internal}$ further comprises:
   (a) sensing the instantaneous alternator current and multiplying the sensed alternator current signal by a constant representing the equivalent lumped resistance of the alternator winding to provide a signal representing the voltage drop across the lumped resistance of the alternator winding;
   (b) sensing the instantaneous piston velocity to provide a piston velocity signal; and
   (c) summing the sensed signals to obtain a signal representing $V_{internal}$.

5. A method in accordance with claim 2 wherein the step of sensing and computing the instantaneous value of $V_{internal}$ further comprises:
   (a) sensing the terminal voltage across the alternator winding to provide an alternator terminal voltage signal;
   (b) sensing the instantaneous alternator current, differentiating the sensed current for computing the rate of change of the alternator current with respect to time and multiplying that rate by the winding inductance to provide a signal representing the voltage drop across the lumped inductance of the alternator winding; and
   (c) computing the difference between the signals which represents $V_{internal}$.

* * * * *

UNITED STATES PATENT AND TRADEMARK OFFICE
CERTIFICATE OF CORRECTION

| | | |
|---|---|---|
| PATENT NO. | : 7,633,173 B2 | Page 1 of 1 |
| APPLICATION NO. | : 12/194588 | |
| DATED | : December 15, 2009 | |
| INVENTOR(S) | : Douglas E. Keiter and Ezekiel S. Holliday | |

It is certified that error appears in the above-identified patent and that said Letters Patent is hereby corrected as shown below:

Column 1, line 16, insert -- This invention was made with government support under contract W911NF-04-C-0053 awarded by the U.S. Army. The government has certain rights in the invention. --.

Signed and Sealed this

First Day of January, 2013

David J. Kappos
*Director of the United States Patent and Trademark Office*